(12) United States Patent  
Visharam et al.

(10) Patent No.: US 8,155,184 B2  
(45) Date of Patent: Apr. 10, 2012

(54) VIDEO CODING SYSTEM USING TEXTURE ANALYSIS AND SYNTHESIS IN A SCALABLE CODING FRAMEWORK

(75) Inventors: Mohammed Zubair Visharam, Santa Clara, CA (US); Ali Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 846 days.

(21) Appl. No.: 12/235,499

(22) Filed: Sep. 22, 2008

(65) Prior Publication Data

US 2009/0180552 A1 Jul. 16, 2009

Related U.S. Application Data

(60) Provisional application No. 61/011,428, filed on Jan. 16, 2008.

(51) Int. Cl.
*H04N 7/12* (2006.01)
*H04N 7/167* (2011.01)

(52) U.S. Cl. ......... 375/240.08; 375/240.24; 375/240.25; 375/240.26; 380/217

(58) Field of Classification Search .............. 375/240.08
See application file for complete search history.

(56) References Cited

U.S. PATENT DOCUMENTS

| | | |
|---|---|---|
| 6,490,320 B1 | 12/2002 | Vetro et al. |
| 6,493,387 B1 | 12/2002 | Shin et al. |
| 6,985,526 B2 | 1/2006 | Bottreau et al. |
| 2006/0008003 A1 | 1/2006 | Ji et al. |
| 2006/0013306 A1 | 1/2006 | Kim et al. |
| 2006/0039617 A1 | 2/2006 | Makai et al. |
| 2006/0109907 A1 | 5/2006 | Sato et al. |
| 2006/0114993 A1 | 6/2006 | Xiong et al. |
| 2006/0233254 A1 | 10/2006 | Lee et al. |
| 2007/0098162 A1 | 5/2007 | Shin |
| 2007/0160134 A1 | 7/2007 | Segall |
| 2007/0211798 A1 | 9/2007 | Boyce et al. |
| 2007/0230568 A1 | 10/2007 | Eleftheriadis et al. |
| 2007/0268964 A1 | 11/2007 | Zhao |
| 2008/0310497 A1* | 12/2008 | Amonou et al. ......... 375/240.01 |

OTHER PUBLICATIONS

IEEE-2006 "A Content Based Video-Coding Approach for Rigid and Non-Rigid tectures"—Ndjiki-Nya, 2006.*
P. Ndjiki-Nya et al. A Content-Based Video Coding Approach for Rigid and Non-Rigid Textures, International Conference on Image Processing, Oct. 8-11, 2006, pp. 3169-3172.

(Continued)

*Primary Examiner* — Longbit Chai
(74) *Attorney, Agent, or Firm* — John P. O'Banion

(57) ABSTRACT

An apparatus or method of efficiently coding high resolution video using texture analysis and synthesis techniques in a scalable video coding framework. A high-resolution video signal is spatially downsampled and encoded into a base-layer. Texture and structure information are extracted from the downsampled signal and base-layer for use by a texture synthesizer. The texture synthesizer is structurally and texturally aware utilizing edge information from a base-layer of the synthesizer to improve synthesis. After synthesis, a video quality assessor directs enhancement-layer coding of unacceptably synthesized areas by alternate (non-textural) coding means, such as conventional AVC or MPEG-2 coding. In one mode, the quality assessor iteratively improves synthesis of certain blocks to make them acceptable for enhancement-layer coding. The apparatus or method outputs a bit stream, or bit streams, containing both the coded base-layer and the enhancement-layer.

16 Claims, 4 Drawing Sheets

OTHER PUBLICATIONS

Y. Bao et al. A low-complexity AVC-based scalable video codec. ITU-T SG16 0.6 VCEG, Doc. VCEB-Y13, Geneva, Switzerland, Nov. 22-24, 2004.

J. Jia et al. An improvement of coding efficiency for DVC enhancement layer by polyphase down sampling. Joint Video Team of ISO/IEC MPEG and ITU-T VCEG, Doc.JVT-P051, 16th Meeting, Poznan, PL, Jul. 24-29, 2005.

Y.M. Ro et al. MPEG-7 homogeneous texture descriptor.ETRI Journal, vol. 23, No. 2, pp. 41-51 (2001).

H. Schwarz et al. Overview of the scalable H.264/MPEG4-AVC extension. Proceedings of the IEEE Intl. Conference on Image Processing (ICIP), Atlanta, Georgia, U.S.A., Oct. 2006.

P. Ndjiki-Nya et al. Generic and robust video coding with texture analysis and synthesis (abstract). IEEE International Conference on Multimedia and Expo, Jul. 2-5, 2007, pp. 1447-1450.

P. Ndjiki-Nya et al. Improved video coding through texture analysis and synthesis. International Workshop on Image Analysis for Multimedia Interactive Services (WIAMIS'04), Lisbon, Portugal, Apr. 2004.

P. Ndjiki-Nya et al. A new generic texture synthesis approach for enhanced H.264 /MPEG4-AVC video coding. Visual content processing and representation: 9th international workshop, VLBV 2005, Sardinia, Italy, Sep. 15-16, 2005.

G. Boisson et al. Efficient scalable motion coding for wide-range scalable video compression. Proceedings of XII. European Signal Processing Conference, EUSIPCO-2004, Vienna, Austria, Sep. 2004, pp. 1979-1982.

Patrick Ndjiki-Nya et al, A Content-Based Video Coding Approach for Rigid and Non-Rigid Textures, International Conference on Image Processing, Oct. 8-11, 2006, pp. 3169-3172.

Yiliang Bao et al, A Low-Complexity AVC-based scalable video codec, ITU-T SG16 Q.6 VCEG, Geneva, Switzerland, Nov. 22-24, 2004.

Jie Jia et al, An improvement on coding efficiency for SVC enhancement layer by polyphase down sampling, Joint Video Team (JVT) of ISO/IEC MPEG & ITU-T VCEG, 16th Meeting: Poznan, PL, Jul. 24-29, 2005.

Yong Man Ro et al. MPEG-7 homogeneous texture descriptor, ETRI Journal, vol. 23, No. 2, pp. 41-51 (2001).

Heiko Schwarz et al., Overview of the scalable H.264/MPEG4-AVC extension, Circuits and Systems for Video Technology, IEEE Transactions on, vol. 17, No. 9. (2007), pp. 1103-1120.

* cited by examiner

VIDEO CODING SYSTEM USING TEXTURE ANALYSIS AND SYNTHESIS IN A SCALABLE CODING FRAMEWORK

CROSS-REFERENCE TO RELATED APPLICATIONS

This application claims priority from U.S. provisional application Ser. No. 61/011,428 filed on Jan. 16, 2008, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to a scalable coding framework that employs texture analysis and synthesis for efficient coding of high-resolution video.

2. Description of Related Art

One of the intents of current single layer video coding standards such as AVC/H.264 has been in producing a standard that could provide good video quality at bit rates that are substantially lower than prior standards, such as MPEG-2, H.263, or MPEG-4 Part 2, while maintaining a practical level of complexity. Further extensions in this domain led towards the development of scalable video coding approaches such as the SVC standard, where scalable video coding provides a mechanism by which video can be coded to suit a large number of different applications, or devices, operating with different resolutions. A scalable coder encodes the video into a plurality of layers, such as comprising a base-layer and at least one enhancement-layer. The base-layer should be transmitted with the highest reliability and comprises the 'base' upon which the enhancement-layers rely.

In the search for improving the coding efficiency of video coding standards, new technologies are currently being investigated that promise additional bit-rate savings while offering similar or improved visual quality in relation to current standards. One such technology that is gaining interest is in the field of texture analysis and synthesis.

Recent trends in video coding and perceptual evaluation have shown that the semantic meaning of a particular texture is of more importance to a viewer than providing an exact reproduction of the original texture itself. As such, if sufficiently good texture synthesis methods are provided which reproduce certain classes of textures to a reasonable degree of accuracy, then the viewer will be unable to ascertain that there is a difference in the reproduced texture, in particular, if he or she has not seen the original texture. This technique is now being exploited in the field of video coding to achieve higher gains in coding efficiency.

The majority of techniques currently available, however, employ highly complex schemes for texture analysis and synthesis. If such schemes were applied on high-resolution video data then the system would become overly complex. Also, many of the present techniques either suffer from a loss of textural structure during the synthesis stage, or require the sending of structural information as additional data/side information to preserve the textural properties, thereby increasing the rate of the coded data/bit stream. Thus, a number of shortcomings exist with these current approaches, such as requiring high processing complexity or additional overhead in terms of bit rate.

Accordingly, a need exists for a system and method of scalable video coding which provides higher quality coding without the need of high complexity processing. These needs and others are met within the present invention, which overcomes the deficiencies of previously developed video coding systems and methods.

BRIEF SUMMARY OF THE INVENTION

The present invention is a video coding method that can be embodied in apparatus and systems for compression of high-resolution video using texture analysis and synthesis in a scalable video coding framework. The inventive method utilizes concepts of texture analysis and synthesis using information from lower spatial layers to decide about the nature of the content being coding (e.g., textural area, structural area, flat area, and so forth) with the goal of providing higher coding efficiency.

The present invention mitigates the shortcomings of current methodology by employing a scalable coding framework using texture analysis and synthesis techniques that reduce the bit rate overhead and provide more robust synthesis results by using structural information from base layer videos. As a result the apparatus and methods of the present invention provide a very competitive coding package that aims to provide higher coding efficiency compared to current techniques.

The method of the present invention provides a number of advantages over prior video coding systems that employed texture analysis and synthesis. Prior schemes that employed texture analysis and synthesis for single layer video coding suffered from the drawback that they had to send additional side information along with the synthesis parameters so that the synthesizer could successfully create the texture while retaining the structure. The present invention proposes a structurally and texturally aware synthesizer that utilizes edge information from lower layers of the synthesizer to improve the synthesis. Such an implementation involves "low complexity" texture analysis, so called as it is performed on the low spatial resolution base-layer. A video quality assessor module is utilized for accepting and rejecting synthesis of certain areas. In one mode, the quality assessor programming is configured for iteratively improving synthesis toward rendering marginally non-acceptable synthesized regions as acceptable for enhancement-layer recording. The method accordingly provides enhanced coding performance at higher spatial resolutions in response to the use of advanced texture synthesis which is structurally aware while at the same time offers lower complexity, since much of the textural analysis is performed on the lower resolution base layers.

The following terms are generally described in relation to the specification, and are not to be interpreted toward constraining specific recitations of the specification.

The term "resolution" as applied to images typically refers to spatial resolution, whereby if the text herein does not specify "temporal resolution" or "spatial resolution", then it can be considered to refer to spatial resolution in the most common context of the word "resolution". It will be noted that the term "high-resolution" and "high-definition" are both directed at spatial resolution aspects and within the instant application refer to a spatial resolution which exceeds that which can be encoded in the conventional base layer of a scalable coding format.

The term "macroblock" (MB) as used in video compression represents a block of pixels, such as 16 by 16 pixels, which may also be considered as a collection of blocks, such as 16 blocks of 4 by 4 pixels arranged in an array. Each macroblock contains pixels in each color plane, such as containing 4 Y block, 1 Cb block, 1 Cr block (4:2:0), although other configurations are including 4:2:2 or 4:4:4 YCbCr formats are common. It will be appreciated that the word "block" is typically used herein as an abbreviated reference for "macroblock".

The term "texturally aware" as applied herein refers to recognition of the visual textural properties of the macroblocks (blocks) within the video, and herein the texture information is extracted from the downsampled video, or less preferably from the base level coding.

The term "structurally aware" as applied herein refers to recognition of the visual structural properties (e.g., edges, their directions, thickness, and similar structural properties) of the blocks within the video, and herein the structure information is extracted from the base level coding, or less preferably from the downsampled video.

The invention is amenable to being embodied in a number of ways, including but not limited to the following descriptions.

One embodiment of the invention is a method of coding a high-resolution video sequence, comprising: (a) spatial downsampling of a high-resolution video sequence received as input to obtain downsampled video having a lower spatial resolution video signal; (b) coding of a base-layer of the downsampled video utilizing any desired video coding mechanism, such as conventional video coding; (c) performing texture analysis and classification on the downsampled video; (d) determining structural information from the base-layer decoded video; (e) performing texture synthesis on blocks, which are determined to be texture synthesis compatible, with additional information about structure in response to the structural information; (f) coding an enhancement-layer in response to structure analysis of the base-layer for acceptably synthesized blocks and using an alternate scalable coding framework (e.g., traditional coding) for unacceptably synthesized blocks; and (g) outputting a bit stream containing both the coded base-layer and enhancement-layer.

The texture analysis is performed from the downsampled video, while the structural awareness is preferably extracted from the base-layer coding (i.e., from the decoded base layer). Prior to performing texture synthesis, a determination is made of texture synthesis compatible blocks, and blocks which are not compatible (referred to as non-texture blocks) are coded into the enhancement-layer by an alternate non-textural coding means (e.g., traditional scalable coding approach such as SVC).

The synthesis which is performed based on structure and texture information obtained from the downsampled video preserves edge information of synthesized regions in the high resolution video. After texturally-structurally aware synthesis, a quality assessor programming determines which blocks are visually acceptable for enhancement-layer coding. Non-acceptable blocks are coded by alternate means, such as conventional enhancement-layer coding means (e.g., like SVC).

In one mode of the invention, additional synthesis processing is performed on blocks which are deemed by the assessor to be marginally non-acceptable toward bringing these blocks to an acceptable level of visual quality. These marginal blocks are then treated as unacceptable if they cannot be brought to an acceptable quality level within a desired limit, such as of time, number of iterations, or other metrics.

One embodiment of the invention is a method of coding a high-resolution video sequence, comprising: (a) spatial downsampling of a high-resolution video sequence received as input to obtain downsampled video having a lower spatial resolution video signal; (b) coding of a base-layer of the downsampled video utilizing conventional video coding; (c) performing texture analysis of the downsampled video; (d) performing texture classification of blocks into texture blocks (T blocks) upon which texture synthesis can be performed, and non-texture blocks (NT blocks) upon which alternate non-texture coding is to be performed; (e) obtaining structural information from the decoded base-layer; (f) performing texture synthesis in response to the texture and structural information; (g) performing texture quality assessment of texture blocks to classify visual acceptability of synthesized areas as acceptable, non-acceptable and optional marginally non-acceptable blocks; wherein determination of acceptably synthesized blocks is performed by quality assessor programming which optionally utilizes iterative processing toward bringing marginally non-acceptable blocks up to an acceptable level of visual quality; (h) coding an enhancement-layer in response to structure analysis of the base-layer for acceptably synthesized blocks and using the alternate non-texture coding for unacceptably synthesized blocks; and (i) outputting a bit stream containing both the coded base-layer and enhancement-layer. It should be appreciated that the methods described herein can be expanded to support extendable enhancement-layers, and/or more than one enhancement-layer, in response to different implementations.

One embodiment of the invention is a method of coding a high-resolution video sequence, comprising: (a) a computer configured for processing high-definition video signals; and (b) programming executable on the computer for, (b)(i) spatial downsampling of a high-resolution video sequence received as input to obtain downsampled video having a lower spatial resolution video signal, (b)(ii) coding of a base-layer of the downsampled video utilizing conventional video coding, (b)(iii) performing texture analysis and classification, (b)(iv) determining structural information from the decoded base-layer video, (b)(v) performing texture synthesis on blocks, which are determined to be texture synthesis compatible, in response to the structural information from base layer video, (b)(vi) coding an enhancement-layer in response to structure analysis of the base-layer for acceptably synthesized blocks and using a traditional scalable coding framework for unacceptably synthesized blocks, and (b)(vii) outputting a bit stream containing both the coded base-layer and enhancement-layer.

One embodiment of the invention is a computer-readable media containing a computer program executable on a computer configured for processing high-resolution video and causing the computer to generate scalable coding in response to steps, comprising: (a) spatial downsampling of a high-resolution video sequence received as input to obtain downsampled video having a lower spatial resolution video signal; (b) coding of a base-layer of the downsampled video utilizing conventional video coding; (c) performing texture analysis and classification; (d) determining structural information from the decoded base-layer; (e) performing texture synthesis on blocks, which are determined to be texture synthesis compatible, in response to the structural information obtained from the base layer; (f) coding an enhancement-layer in response to structure analysis of the base-layer for acceptably synthesized blocks and using a traditional scalable coding framework for unacceptably synthesized blocks; and (g) outputting a bit stream containing both the coded base-layer and enhancement-layer.

The present invention provides a number of beneficial aspects which can be implemented either separately or in any desired combination without departing from the present teachings.

An aspect of the invention is an apparatus and method for generating scalable video coding of high-definition video.

Another aspect of the invention is a high-definition coder which provides high coding performance in response to the use of advanced structurally aware texture synthesis.

Another aspect of the invention is a high-definition coder which preserves edge information of synthesized areas in response to awareness of the structure as determined from the decoded base-layer.

Another aspect of the invention is a high-definition coder which generates a base-layer and an enhancement-layer.

Another aspect of the invention is a high-definition coder which uses a textural synthesizer which is structurally aware.

Another aspect of the invention is a structurally aware texture synthesizer which extracts edge information (e.g., extent of edges, positions and directions) from the base-layer.

Another aspect of the invention is a high-definition coder which utilizes low complexity level texture analysis performed on data after it is downsampled from the high-definition video input.

Another aspect of the invention is a high-definition coder which employs a quality assessor for selectively accepting synthesis results into the enhancement-layer being generated.

Another aspect of the invention is a quality assessor that iteratively attempts to clean up marginally unacceptable synthesized blocks to make them acceptable for use in the enhancement-layer.

Another aspect of the invention is a quality assessor that relegates non-acceptable synthesized blocks, including marginally non-acceptable blocks which could not be adequately corrected, to being coded by alternate non-texture means, such as conventional techniques.

Another aspect of the invention is a high-resolution coder which utilizes alternate non-texture means, such as AVC or MPEG-2 protocols for coding of blocks that could not be acceptably synthesized.

A still further aspect of the invention is a high-definition coder which can be implemented as an apparatus, system, method, as programming executable on a computer, as programming configured for distribution on a media or over a communication network and execution by one or more associated computers, and combinations thereof.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus and method generally shown in FIG. 1 through FIG. 4. It will be appreciated that the apparatus (or system) may vary as to configuration and as to details of the parts, and that the method may vary as to the specific steps and sequence, without departing from the basic concepts as disclosed herein.

Figure 1:
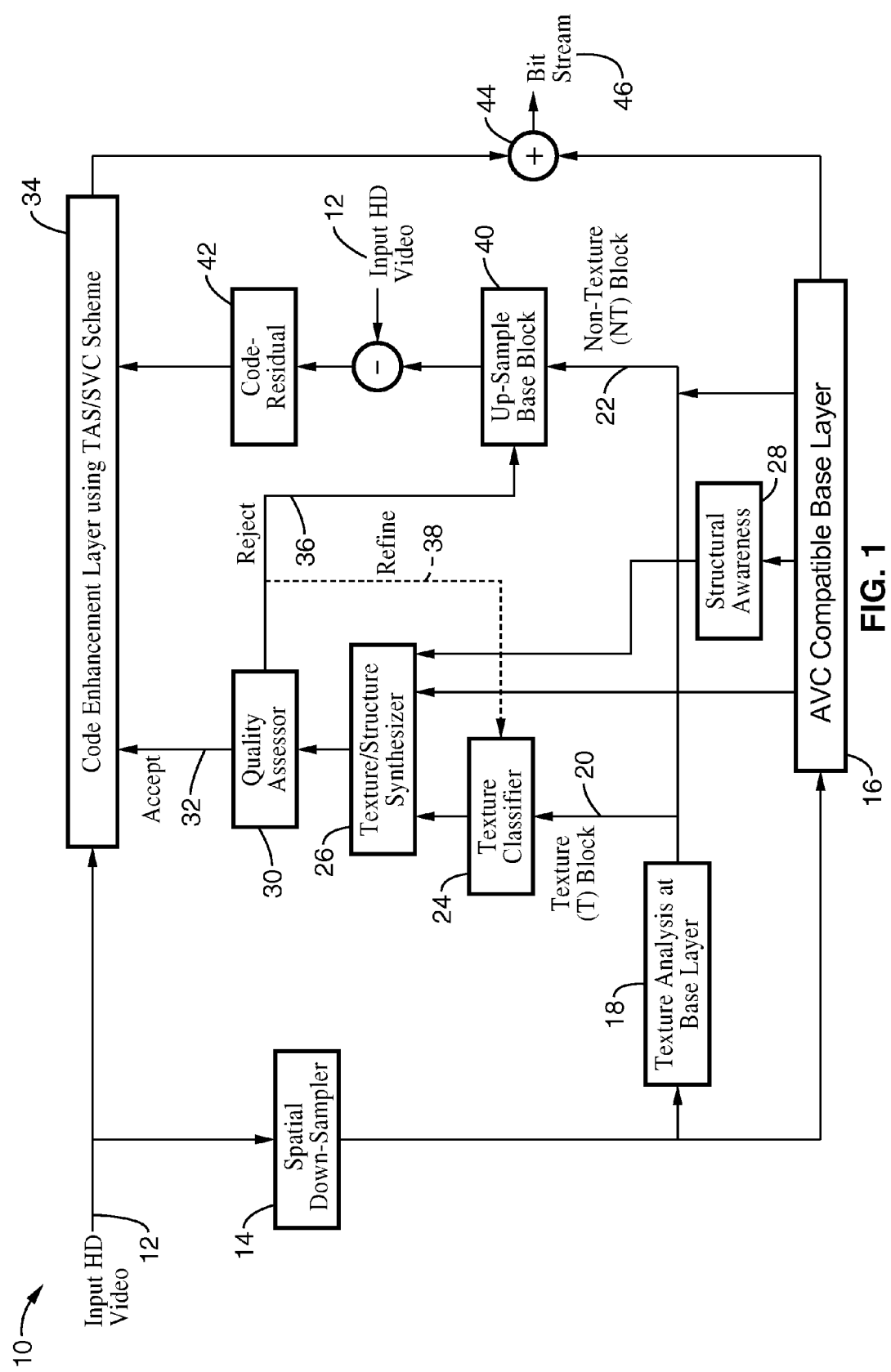
FIG. 1 is a block diagram of scalable video coding using texture analysis and structural synthesis according to an embodiment of the present invention.

FIG. 1 illustrates an example embodiment 10 of the scalable video coding system according to the present invention, which utilizes texture analysis and synthesis that obtains its structural and textural awareness from the lower spatial layers, such as from the base-layer or downsampled video. It should be appreciated that the functional blocks shown in FIG. 1 are provided by way of convenient division of the processing required to achieve the inventive aspects, and are not by way of requiring segregation of these functions per the limits of each block. One of ordinary skill in the art could readily adopt the teachings of the present invention without retaining the precise modular definition, while not departing from the teachings of the present invention. Accordingly, the functions of the present invention can be combined or separated in multitudinous ways without departing from the teachings of the present invention. The convenient term "module" is often utilized in the following descriptions for referring to these functions, however, the use of this term does not infer any limitation of a specific physical segregation or packaging of the functions.

A high-resolution (e.g., high-definition (HD)) video sequence 12 is used as input, and passed through a spatial down-sampling means 14 (e.g., downsampling filter) to obtain a lower resolution video signal, which for example may be coded using any desired video coding system, such as represented by an AVC compatible base-layer 16, although MPEG-2 and other protocols may be utilized. This downsampled low spatial resolution signal is used as the input signal to a texture analysis module 18 and the remainder of the video coding system embodiment.

In parallel with base-layer coding, the texture analysis module 18 classifies each of the macroblocks (MBs), generally referred to as simply "blocks", in the input video with regard to its suitability for texture synthesis. For example, each block is classified as either being a candidate for texture synthesis, referred to herein as a "texture block" (T block) 20, or a "non-texture block" (NT block) 22 in response to an analysis and subsequent determination based on the spatio-temporal characteristics of the input signal.

The blocks classified as T blocks, are processed through a further refinement using a texture classifier 24 whose main function is to categorize the property of the incoming texture block 'T' accurately so that proper synthesis mechanisms can be subsequently employed by the following texture synthesizer 26. The texture classifier could for example segregate 'T' blocks based on various local properties varying from cases that are very rigid like stones, flowers, and so forth to less rigid as in the case of water, smoke, and the like so that the synthesis module is able to apply synthesis schemes that are more apt to such textures. The texture synthesizer also accepts input from the structural awareness module 28. One important aspect of employing structural awareness in this inventive method is that it operates to preserve edge information in synthesized areas that is usually lost during synthesis. Information on the structure is obtained from the base-layer decoded video 16. Structural information in the form of edges, their extent and direction can be obtained either by employing simple edge detection techniques, or by applying more complex spatio-temporal segmentation techniques on the base layer video. It should be appreciated that since base-layer 16 does not undergo texture synthesis, the bulk of original edge information is preserved, insofar as the base-layer has not been savagely quantized. Structure information from the base-layer includes edge information, and may describe the extent and direction of these edges/structures. The structurally aware synthesizer 26 receives the structure information from the base-layer to enhance and to direct the synthesis process. In at least one implementation, the texture synthesizer utilizes the texture information available in the decoded base layer to aid it during the synthesis process. A flow line is seen in FIG. 1 connecting synthesizer 26 to base layer 16, wherein the synthesis module can utilize the low resolution texture information from the base layer to help it in the synthesis process of the high resolution layer.

Synthesis data for a synthesized area is then output to a quality assessor module 30 which determines the acceptability of the synthesized output. In one preferred implementation, the assessor determines whether the synthesized area is (1) visually acceptable, (2) visually unacceptable, or (3) marginally unacceptable. If the area synthesis is acceptable, then the analysis/synthesis parameters 32 are accepted, along with the relevant masks, into enhancement-layer 34. If the area synthesis is unacceptable, then the synthesis is rejected 36, and enhancement coding for this synthesized area is skipped and a non-structurally aware coding method utilized, such as preferably following the same approach utilized for coding the NT blocks. In the case of marginally unacceptable synthesis, an iterative refinement process is started 38 by quality assessor 30, which preferably operates until the synthesis is acceptable, or until a limit is reached for processing wherein the synthesis is finally rejected 36. It will be noted from the figure that the resultant enhancement layer and base layer are combined 44 into bit stream 46.

Considering the processing of the blocks that are classified as NT blocks, the figure illustrates processing these blocks according to an alternate coding mechanism. It should be appreciated that any desired coding framework may be utilized for this alternate coding, such as a traditional scalable coding framework.

In the example shown, if the base-layer block was intra-coded, then the base-layer block is decoded, and up-sampled 40 with a residual coder 42 using original input high-definition video signal 12 to code enhancement-layer 34.

However, if the base-layer block was inter-coded, then the motion vector information (mv) from the base-layer block is up-sampled, the following describes a couple of cases and subclasses by way of example and not limitation. (1) If the up-sampled motion vector falls in a non-synthesized region in the reference frame of the enhancement-layer, then a refinement mv is calculated and the residual is coded along with a refinement mv. (2) If this up-sampled motion vector falls in a synthesized region in the reference frame, then two choices are available: (a) replacing the current block with a synthesized reference block with no residual being sent, or (b) decoding the base-layer inter-coded block, up-sampling the signal and then coding the residual obtained from the enhancement-layer video which is a process that may require multiple decoders.

As a result of the above processing, the high-definition video is coded into a scalable bit stream in which the base-layer conforms to a traditional video coding system (e.g., AVC or MPEG-2) and the enhancement-layer employs a mixture of texture and non-texture coding.

It should be noted that since the texture analysis is performed on the low spatial resolution base-layer it is a low complexity analysis. The synthesizing process is performed in response to knowledge of structure and texture. Synthesis therein becomes a 'take it or leave it' proposition, in response to the operation of a quality assessor module which determines whether the synthesis can be used, needs more work, or is rejected in deference to an alternative approach, such as a conventional enhancement coding approach. Overall, the apparatus and method of the present invention provides improved coding performance at higher spatial resolutions due to the advanced use of texture and structure synthesis.

Figure 2:
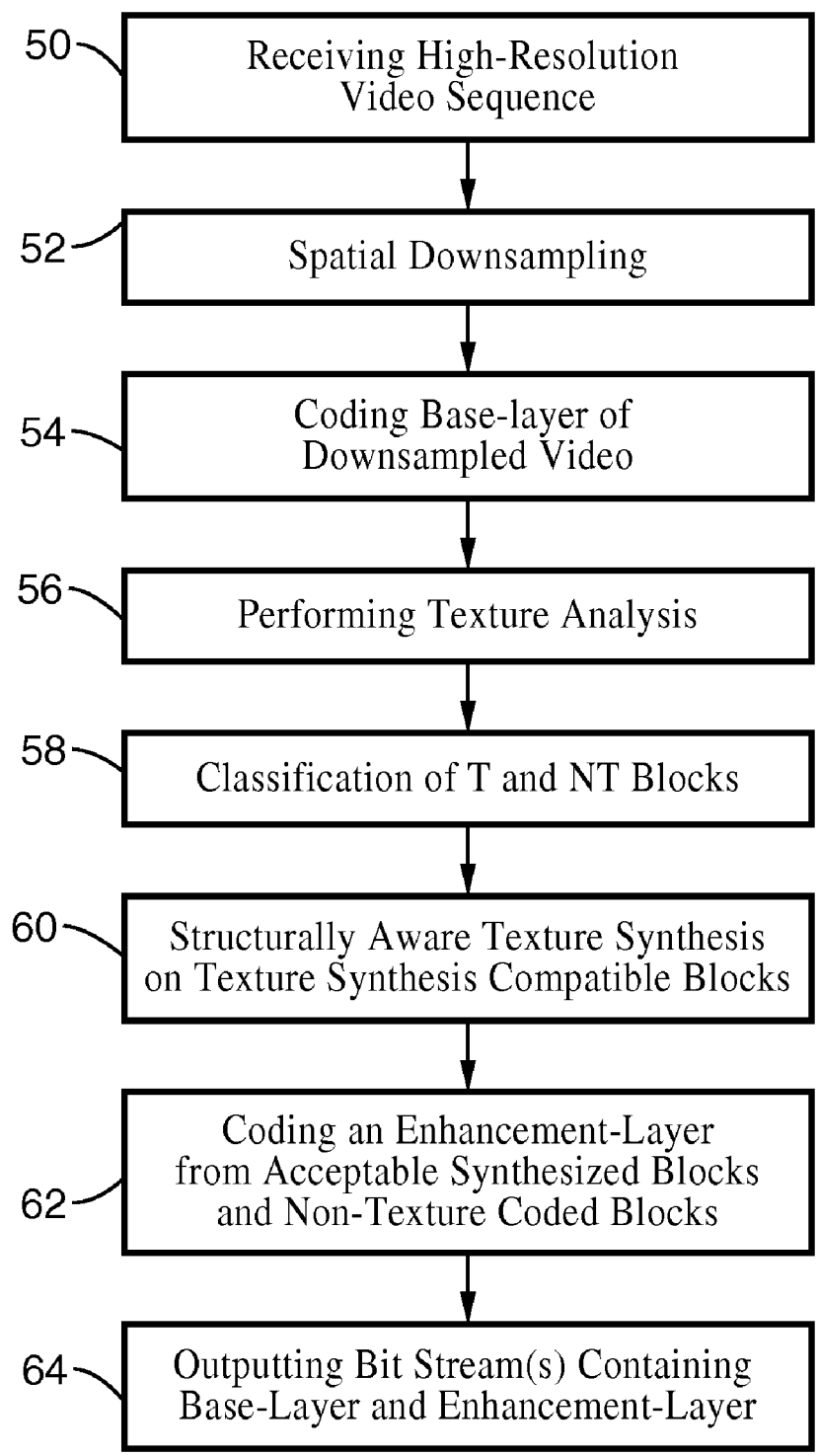
FIG. 2 is a flow diagram of enhancement-layer coding steps according to an embodiment of the present invention.

FIG. 2 illustrates an embodiment of the texturally and structurally aware enhancement-layer coding of the present invention. In referring to the flow diagrams the term "step" will be used in referring to each flowchart "block" of the figure, so as to minimize confusion with the macroblocks (blocks) upon which the video operations are performed upon. It should be appreciated that variations in the specific steps or sequences can be implemented by one of ordinary skill in the art without departing from the teachings of the present invention. The receipt of high-definition video is represented by step 50, and which is spatially downsampled in step 52, and which is then coded into a base-layer as per step 54. Texture analysis is performed in step 56 on the down-sampled video base-layer, wherein the blocks are classified as T blocks (texture-synthesizable blocks) and NT blocks (non-texture-synthesizable blocks) in step 58. Further refinement of the T blocks is performed with additional texture classification and structurally aware texture synthesis performed at step 60. From the synthesized information, coding 62 of an enhancement-layer is performed in combination with coding from non-texture coded blocks. Step 64 represents outputting at least one bit stream containing a base-layer and at least one enhancement-layer. Although for most applications, a single bit stream is output containing the base-layer and enhancement-layer(s), it should be appreciated that select applications may be configured for separately receiving information from the base-layer and enhancement-layers, such as toward performing additional processing.

Figure 3:
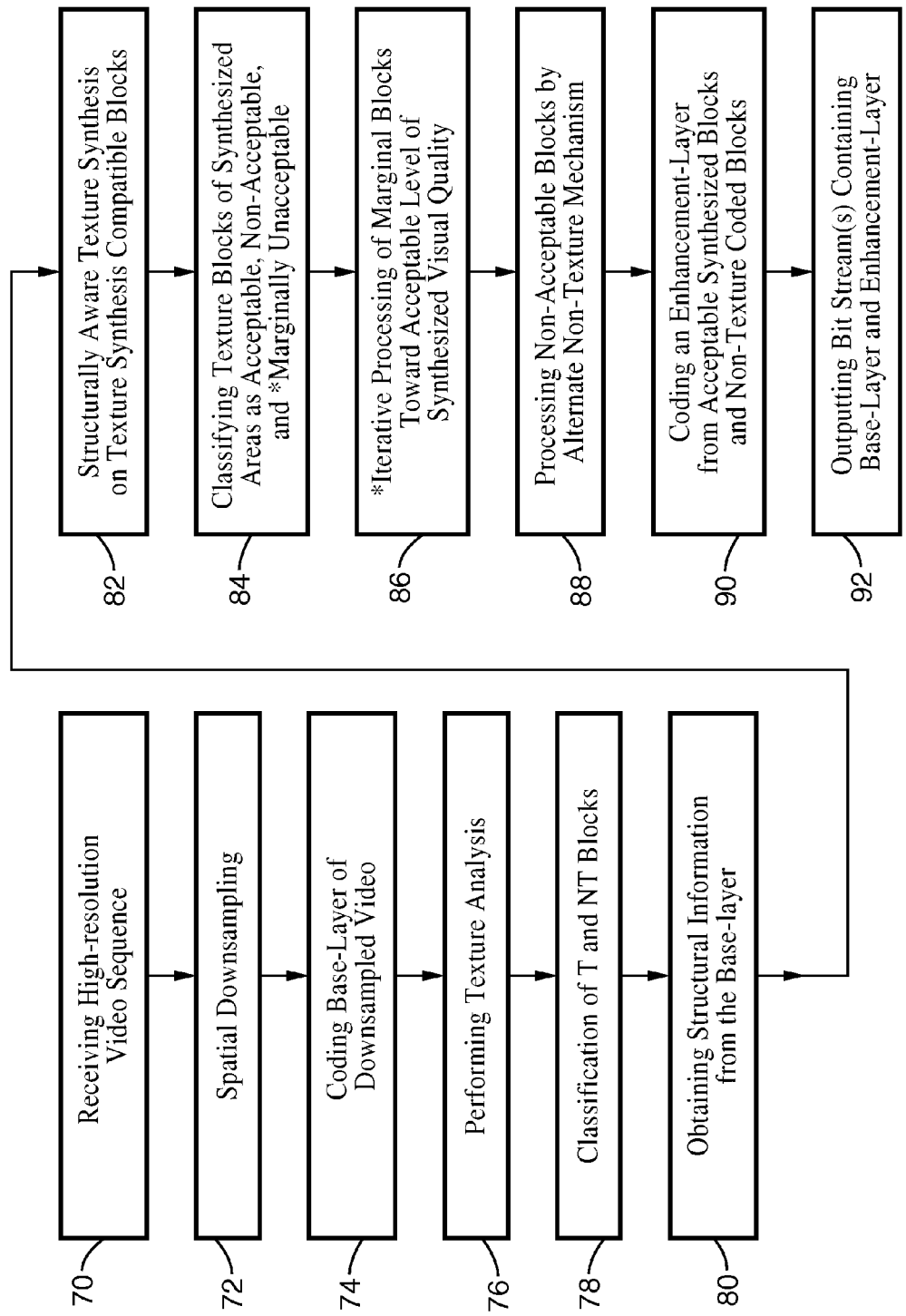
FIG. 3 is a flow diagram of detailed enhancement-layer coding steps according to an aspect of the present invention.

FIG. 3 illustrates an embodiment of the texturally and structurally aware enhancement-layer coding of the present invention, showing additional details not shown in FIG. 2. The receipt of high-resolution video is represented by step 70, which is spatially downsampled in step 72, and which is then coded into a base-layer in step 74. Texture analysis is performed in step 76 on the downsampled video base-layer, wherein the blocks are classified as T and NT blocks in step 78. Structural information, including information about the presence and positioning of edges, is determined from the base-layer at step 80. Further refinement of the T blocks is performed with additional texture classification and then structurally-aware texture synthesis is performed in step 82. Quality assessment processing then classifies texture blocks of synthesized areas as either acceptable or non-acceptable as represented by step 84. In a preferred mode of the invention, areas can also be optionally classified as marginally non-acceptable in step 84, wherein in optional step 86 iterative processing is performed toward bringing marginal blocks up to acceptable levels of synthesized visual quality. Attempts to bring the synthesized area to an acceptable quality level are limited in terms of time, number of iterations, or other threshold mechanism, whereby the overall coding process is not hindered. In step 88 processing of the non-acceptable blocks is performed by an alternate non-textural coding mechanism, such as by conventional video coding including AVC or MPEG-2 coding. From the synthesized information, an enhancement-layer is coded in step 90 in combination with information from non-texture coded blocks. Finally, step 92 represents outputting a bit stream (or at least one bit stream) which contains the base-layer and the enhancement-layer.

Figure 4:
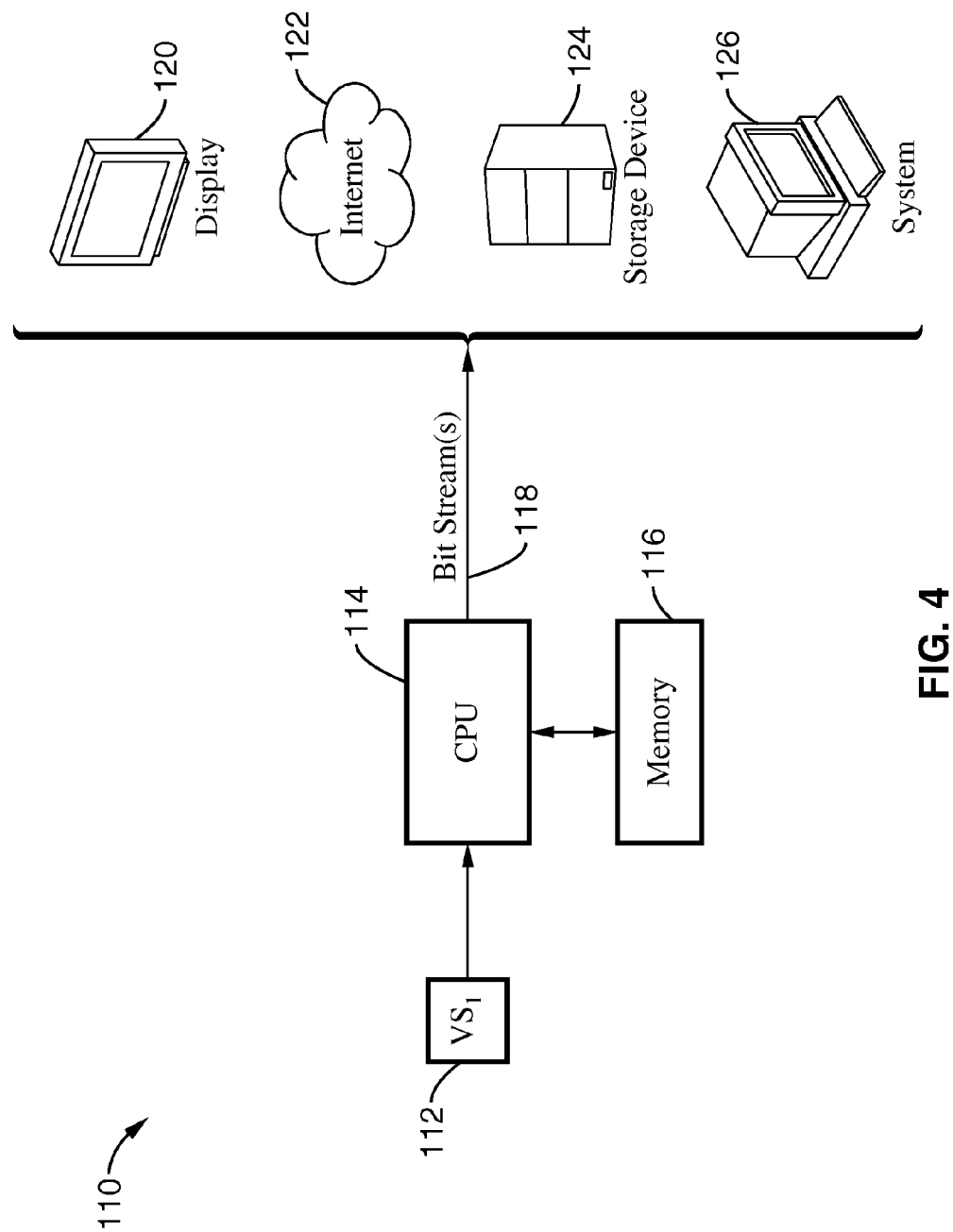
FIG. 4 is a block diagram of a system (or apparatus) configured for generating a bit stream containing a base-layer and an enhancement-layer, showing a computer and memory within the system according to an aspect of the present invention.

FIG. 4 illustrates an implementation of the present invention in the context of a computer processor enabled device 110. A video source provides a high-resolution signal 112 which is received by at least one computer processing element 114 (e.g., CPU, microprocessor, DSP, ASIC containing a processor core, and so forth) which has access to at least one memory 116 from which instructions are executed for performing the method according to the present invention and generating data output, such as at least one bit stream 118, containing a base-layer and at least one enhancement-layer.

It should be appreciated that memory 116 can comprise any desired forms of memory, and combination thereof, into which executable instructions may be received for processing by computer 114, such as internal semiconductor memory (e.g., static random-access memory (SRAM), dynamic random-access memory (DRAM), FLASH, read-only memory (ROM), and other forms of digital memory), as well as receiving information from external memory sources including semiconductor memories, media devices, networks, and so forth.

In response to structurally aware texture synthesis processing according to the invention, one or more bit streams 118 are output, which include scalable video coding. The scalable video output of the present invention can be utilized in a large number of applications, such as relating to display output 120, communication 122 (e.g., over the Internet), storage 124, and within a variety of video enabled systems 126. It will therefore be appreciated that the present invention may be applied to a number of different application areas in which scalable coding techniques are applicable.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of efficiently coding a high-resolution video sequence, comprising:
   spatial downsampling of a high-resolution video sequence received as input to obtain downsampled video having a lower spatial resolution video signal;
   coding of a base-layer of said downsampled video utilizing conventional video coding;
   performing texture analysis of said downsampled video into texture blocks (T blocks) upon which texture synthesis can be performed, and non-texture blocks (NT blocks) upon which alternate non-textural coding is to be performed;
   performing texture classification of T blocks into various categories varying from highly rigid to non-rigid so that effective synthesis techniques can be performed dependent upon the classification;
   obtaining structural information from said base-layer;
   performing texture synthesis in response to said structural information;
   performing texture quality assessment of texture blocks to classify visual acceptability of synthesized areas as acceptable, non-acceptable and marginally non-acceptable;
   wherein determining of acceptably synthesized blocks is performed by quality assessor programming which utilizes iterative processing of the texture classification and texture synthesis toward bringing marginally non-acceptable blocks up to an acceptable level of visual quality;
   coding an enhancement-layer in response to structure analysis of the base-layer for acceptably synthesized blocks and using said alternate non-textural coding for unacceptably synthesized blocks; and
   outputting at least one bit stream containing the coded base-layer and the enhancement-layer;
   wherein said alternate non-textural coding comprises:
      (a) determining that a block is an intra-coded non-texture block, wherein the base-layer block is decoded, up-sampled, and a residual computed using the original input high-definition video signal; and
      (b) determining that a block is an inter-coded non-texture block, wherein the motion vector information (mv) from the base-layer is up-sampled, and
         (i) for an mv in a non-synthesized region in the reference frame of the enhancement-layer, a refinement for mv is calculated, after which residual and refinement mv are coded, or
         (ii) for an mv in a synthesized region of the reference frame of the enhancement-layer, the synthesized reference block is replaced with the current block, or (iii) for an mv in a synthesized region of the reference frame of the enhancement-layer, a base-layer inter block is decoded, the downsampled video is up-sampled, and the residual from the enhancement-layer video is coded through at least one decoder.

2. A method as recited in claim 1, wherein said performing of texture classification comprises characterizing each block in said downsampled video, with respect to its texture synthesis ability, in response to spatio-temporal characteristics of the downsampled video.

3. A method as recited in claim 1, wherein said alternate non-texture coding comprises conventional video coding utilizing AVC or MPEG-2 protocols.

4. A method as recited in claim 1, wherein said method is structurally aware in response to decoding of the base-layer to extract structural features.

5. A method as recited in claim 4, wherein said structural features comprise the extent of edges or structure as well as their position and direction.

6. A method as recited in claim 5, wherein structural features are preserved by obtaining structural information from the decoded base-layer which is not subject to texture synthesis.

7. A method as recited in claim 1, wherein said texture synthesis is performed in response to structural information about the presence, extent and positioning of edges and structures.

8. A method as recited in claim 1, wherein said texture synthesis utilizes low resolution texture information from the decoded base layer during the synthesis process of the high resolution layer.

9. A non-transitory computer-readable storage media containing a computer program executable on a computer configured for processing high-resolution video and causing the computer to generate scalable coding in response to steps, comprising:
   spatial downsampling of a high-resolution video sequence received as input to obtain downsampled video having a lower spatial resolution video signal;
   coding of a base-layer of said downsampled video into a decoded base layer utilizing non-textural video coding;
   performing texture analysis of said downsampled video into texture blocks (T blocks) upon which texture synthesis can be performed, and non-texture blocks (NT blocks) upon which alternate non-textural coding is to be performed;
   performing texture classification of T blocks into various categories varying from highly rigid to non-rigid so that effective synthesis techniques can be performed dependent upon the classification;
   determining structural information from said decoded base-layer;
   performing texture synthesis on blocks, which are determined to be texture synthesis compatible, in response to receipt said structural information obtained from said decoded base layer;
   performing texture quality assessment of texture blocks to classify visual acceptability of synthesized areas as acceptable, non-acceptable and marginally non-acceptable;
   wherein determining of acceptably synthesized blocks is performed by quality assessor programming which utilizes iterative processing of the texture classification and texture synthesis toward bringing marginally non-acceptable blocks up to an acceptable level of visual quality;
   coding an enhancement-layer in response to structural information from the base-layer for blocks which were acceptably synthesized, and using a non-textural coding framework for blocks which were not synthesized or for which acceptable synthesized results were not obtained; and
   outputting at least one bit stream containing the coded base-layer and the enhancement-layer;
   wherein said alternate non-textural coding comprises:
      (a) determining that a block is an intra-coded non-texture block, wherein the base-layer block is decoded, up-sampled, and a residual computed using the original input high-definition video signal; and
      (b) determining that a block is an inter-coded non-texture block, wherein the motion vector information (mv) from the base-layer is up-sampled, and
         (i) for an mv in a non-synthesized region in the reference frame of the enhancement-layer, a refinement for mv is calculated, after which residual and refinement mv are coded, or
         (ii) for an mv in a synthesized region of the reference frame of the enhancement-layer, the synthesized reference block is replaced with the current block, or
         (iii) for an mv in a synthesized region of the reference frame of the enhancement-layer, a base-layer inter block is decoded, the downsampled video is up-sampled, and the residual from the enhancement-layer video is coded through at least one decoder.

10. The non-transitory computer-readable storage media recited in claim 9, wherein said performing of texture classification comprises characterizing each block in said downsampled video, with respect to its texture synthesis ability, in response to spatio-temporal characteristics of the downsampled video.

11. The non-transitory computer-readable storage media recited in claim 9, wherein said alternate non-texture coding comprises conventional video coding utilizing AVC or MPEG-2 protocols.

12. The non-transitory computer-readable storage media as recited in claim 9, wherein said method is structurally aware in response to decoding of the base-layer to extract structural features.

13. The non-transitory computer-readable storage media as recited in claim 12, wherein said structural features comprise the extent of edges or structure as well as their position and direction.

14. The non-transitory computer-readable storage media as recited in claim 13, wherein structural features are preserved by obtaining structural information from the decoded base-layer which is not subject to texture synthesis.

15. The non-transitory computer-readable storage media as recited in claim 9, wherein said texture synthesis is performed in response to structural information about the presence, extent and positioning of edges and structures.

16. The non-transitory computer-readable storage media as recited in claim 9, wherein said texture synthesis utilizes low resolution texture information from the decoded base layer during the synthesis process of the high resolution layer.

* * * * *